UNITED STATES PATENT OFFICE.

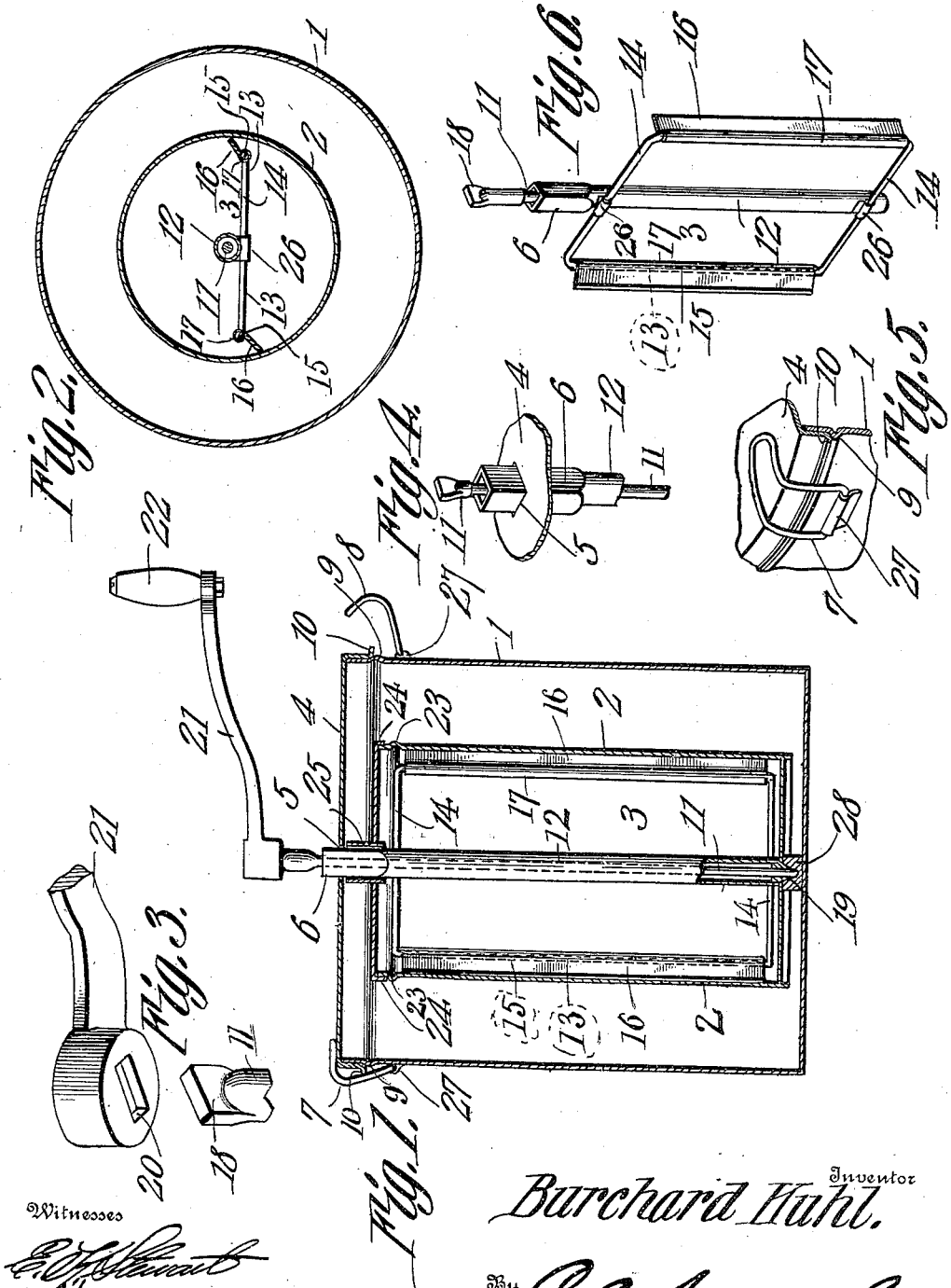

BURCHARD KUHL, OF ORLANDO, FLORIDA, ASSIGNOR TO SMITH & HEMENWAY COMPANY, OF NEW YORK, N. Y., A CORPORATION OF WEST VIRGINIA.

ICE-CREAM FREEZER.

995,610.   Specification of Letters Patent.   Patented June 20, 1911.

Application filed October 31, 1908. Serial No. 460,464.

*To all whom it may concern:*

Be it known that I, BURCHARD KUHL, a citizen of the United States, residing at Orlando, in the county of Orange and State of Florida, have invented a new and useful Ice-Cream Freezer, of which the following is a specification.

The objects of the invention are, generally, the provision, in a merchantable form, of a device of the class above mentioned, which shall be inexpensive to manufacture, facile in operation, and devoid of complicated parts; specifically, the provision of a device of the class above mentioned, in which the ice receptacle, cream can and scraper frame, shall be of novel and improved construction; the provision of novel means for operating the device; other and further objects being made manifest hereinafter as the description of the invention progresses.

The invention consists in the novel construction and arrangement of parts hereinafter described, delineated in the accompanying drawings, and particularly pointed out in the appended claims, it being understood that divers changes in the form, proportions, size, and minor details of the structure may be made, without departing from the spirit or sacrificing any of the advantages of the invention.

Similar numerals of reference are employed to denote corresponding parts throughout the several figures of the drawings.

In the accompanying drawings:—Figure 1 shows my invention in vertical longitudinal section; Fig. 2 is a horizontal section; Fig. 3 is a detail perspective, intended to show the relation between the shaft 11 and the crank 21; Fig. 4 is a detail perspective, showing a portion of the lid 4 of the ice receptacle 1, together with portions of the parts which pass through the said lid; Fig. 5 is a detail perspective showing the clamp 7 in its relation to the sides and lid of the ice receptacle 1; Fig. 6 is a detail perspective of the scraper frame 3.

In carrying out my invention, I provide an ice receptacle 1, which may be of any form. Preferably, however, as shown, it is cylindrical in shape, and having an annular shoulder 9 projecting from its periphery near its top, upon which is mounted a lid 4, having an outwardly projecting lip 10, arranged to contact with the shoulder 9. The sides of the ice receptacle 1 carry clips 27, in which are pivoted clamps 7 and 8, which, in their preferred form, are loop-shaped and bent to form a right angle arranged to engage the top of the lid 4, as clearly shown in Fig. 5. The lid 4 is provided with a central, non-circular opening 5, and the bottom of the ice receptacle 1 carries a step bearing 28 arranged to receive the lower terminal of the shaft 11, as hereinafter described.

Mounted within the ice receptacle 1 is the cream can 2, which, like the ice receptacle, is in its preferred form cylindrical. The cream can 2 is provided near its top with an outwardly projecting annular shoulder 23, and a lid 24 is arranged to fit upon the top of the cream can 2 and has its edge in contact with the shoulder 23, as is shown in Fig. 1. Mounted in the bottom of the cream can 2 is a centrally disposed conico-cylindrical bearing 19, the cylindrical portion being within the cream can, and the conical portion being without the cream can and arranged to coöperate with the bearing 28 borne by the bottom of the ice receptacle 1. The shaft 11 is axially mounted in the cream can 2, its lower end passing through the bearing 19, rigidly mounted therein, and serving to form the extreme pivotal connection upon which the cream can 2 is supported.

Referring now to Fig. 3, it will be seen that the shaft 11 is provided with a non-circular upper terminal 18, arranged to register in an opening 20, corresponding in shape to the terminal 18, in a lever 21, the said lever 21 being provided with a handle 22, which may be of any form.

I have further shown a scraper frame 3, comprising a sleeve 12 arranged to inclose the shaft 11 and provided at its upper end with a non-circular shank 6, arranged to register with the opening 5 in the lid 4. An oblong or rectangular loop 13, preferably formed from a metallic rod, has its shorter sides 14 attached near their middle points to the sleeve 12 by means of the clips 26. Mounted upon the longer sides 15 of the loop 13 are blades 16, having their inner edges 17 pivotally connected with the longer sides 15 of the loop 13. In practice, I prefer to fashion the connection between the blades 16 and the loop 13 by wrapping the inner edges 17 of the blades about the longer sides 15, as shown in Fig. 6.

Centrally mounted in the lid 24 is the collar 25, through which passes the upper terminal of the sleeve 12, and, inclosed within the sleeve 12, is the shaft 11, the diameter of the collar 25 being such that, as the cream can 2 is rotated, the collar 25 may turn freely with it about the sleeve 12 of the scraper frame.

That the operation of the clamps may readily appear, I have shown one of them, denoted by the numeral 7, in locking position, the other, denoted by the numeral 8, being thrown back.

In assembling my invention, the cream can 2 is placed within the ice receptacle 1, the bearing 19 and the lower end of the shaft 11 engaging the bearing 28. The scraper frame 3 is then introduced into the cream can 2, the sleeve 12 passing over the shaft 11, inclosing it, the lower end of the sleeve 12 engaging the cylindrical portion of the member 19. The lid 24 is then mounted upon the cream can 2, the shank 6 passing out of the lid 24 through the collar 25. The lid 4 is then placed upon the ice receptacle 1, the non-circular opening 5 in the lid 4 engaging the non-circular shank 6 and holding it against rotation. The clamps are then upturned to contact with the top of the lid 4, forcing the lip 10 down firmly upon the shoulder 9, and holding the said lid 4, together with the scraper frame 3, against rotation. The lever 21 is then set in its place, the opening 20 engaging the terminal 18 of the shaft 11. It will thus be seen that, in practical operation, when the lever 21 is rotated it will carry with it the shaft 11, which, being rigidly attached to the cream can 2, will, in its turn, cause the can 2 to be rotated. The shank 6 of the scraper frame 3 being engaged by the opening 5 in the lid 4, and the lid itself being rigidly held to the ice receptacle 1 by means of the clamps, the scraper frame 3 will remain at rest, the cream can 2 rotating about it.

Having thus described my invention, what I claim as new, and desire to protect, by Letters Patent, is:—

1. In a device of the class described, a scraper frame comprising a sleeve, a loop having its lower and upper sides rigidly attached near their middle points to the sleeve, blades disposed at an angle to the plane of the loop and having their inner edges bent about the sides of the loop to form a pivotal connection therewith.

2. In a device of the class described, a scraper frame comprising a sleeve; an oblong loop having its shorter sides rigidly attached near their middle points to the sleeve; flat blades disposed at an angle to the plane of the loop and having their inner edges bent about the longer sides of the loop, to form a pivotal connection therewith.

3. In a device of the class described, a cream-can; a sleeve axially mounted in the cream-can; a conico-cylindrical bearing carried by the bottom of the cream-can, the conical portion of the bearing being without the cream-can, and the cylindrical portion being within the cream-can and journaled for rotation in the lower terminal of the sleeve.

4. In a device of the class described, a scraper frame comprising supporting means for its opposite ends, a loop having its lower and upper sides rigidly attached near their middle points to said supporting means, and blades pivoted at their inner edges to the sides of the loop to form a pivotal connection therewith.

5. In a device of the class described, the combination with an ice-receptacle; of a cream-can rotatably mounted therein; a sleeve axially mounted in said cream-can; a bearing carried by the bottom of said cream-can and journaled for rotation in the lower end of said sleeve; scraping means carried by said sleeve; an axial shaft passing through said sleeve and rigidly secured to said bearing, the lower end of said axial shaft forming a pivotal bearing for said cream-can.

6. In a device of the class described, the combination with an ice-receptacle; of a cream-can rotatably mounted therein; a sleeve axially mounted in said cream can; a conico-cylindrical bearing carried by the bottom of said cream-can, the conical portion of the bearing being without the cream-can and the cylindrical portion being within said cream-can, and journaled for rotation in the lower terminal of the sleeve; an axial shaft extending through said sleeve, the lower end of said axial shaft being rigidly secured to said bearing and passing therethrough to form a pivotal bearing for said cream-can, and means for rotating said axial shaft.

7. The combination of a receptacle, a step bearing secured to the bottom of the receptacle, a can loosely mounted on the step bearing and having a bearing fixed to the bottom thereof for pivoting said can in the step bearing, a rotatable shaft fixed to the bottom of the can and stepped into the step bearing through the bearing of the can, for rotating the can, a fixed sleeve surrounding the rotatable shaft and around which the can is rotated, and a scraper frame fixed to the fixed sleeve.

In testimony that I claim the foregoing as my own, I have hereto affixed my signature in the presence of two witnesses.

BURCHARD KUHL.

Witnesses:
H. N. DICKSON,
WM. T. HAIZLIP.

Copies of this patent may be obtained for five cents each, by addressing the "Commissioner of Patents, Washington, D. C."